March 8, 1932.   D. W. CARTER   1,848,767
DRAIN
Filed Aug. 25, 1930
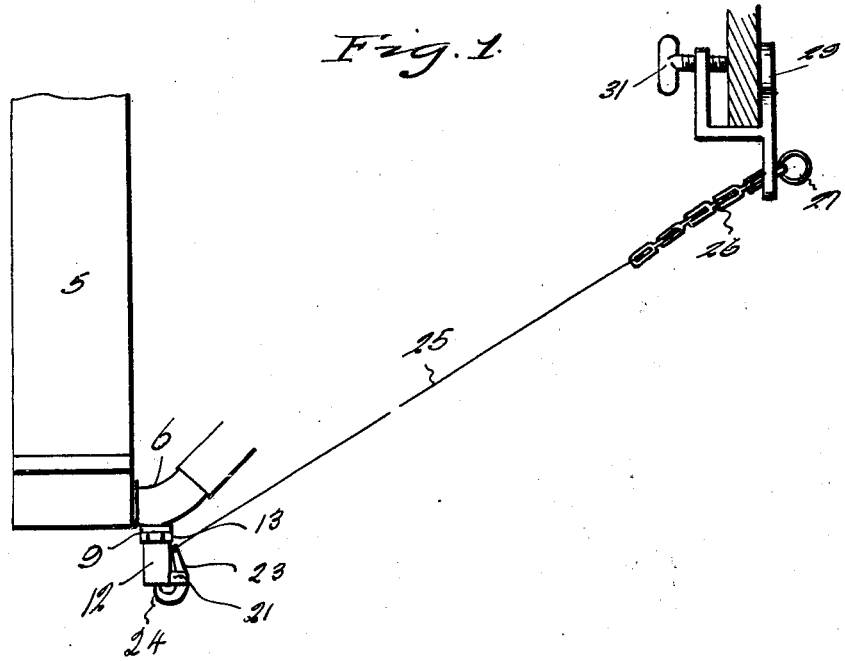
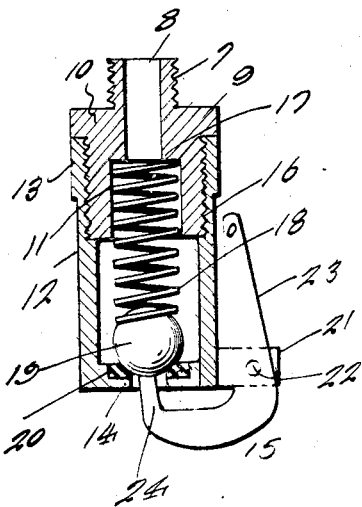
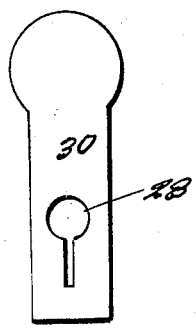
Inventor
Dick W. Carter
By Clarence A. O'Brien
Attorney Patented Mar. 8, 1932

1,848,767

UNITED STATES PATENT OFFICE

DICK W. CARTER, OF COLORADO, TEXAS

DRAIN

Application filed August 25, 1930. Serial No. 477,682.

This invention relates generally to means for draining automobile radiators incorporating means to actuate the drain mechanism from the driver's seat, and particularly to a drain means of this type of new and novel construction.

It is an object of this invention to provide an improved automobile radiator drain having a connection to the dashboard of the automobile for operation therefrom.

It is another object of this invention to provide a device of the character described which provides an improved means for attaching the control means on the dashboard of an automobile.

It is also an object of this invention to provide an improved device of the character described, which is attached to the lower portion of the return pipe of the radiator and which may be installed in any make of automobile radiator.

It is also an object of this invention to provide a device of the indicated improved and novel construction which is simple and easy to manufacture, highly convenient and easy to install and otherwise admirably adapted for the purposes for which it is designed.

These and other objects, the nature of the invention, its combination and arrangement of parts will be readily apparent to anyone familiar with the art to which this invention relates upon reading the following description of the drawings, in which:

Figure 1 is a view of my complete device showing the arrangement and disposition of parts, Figure 2 is a vertical cross section through the main drain valve, and Figure 3 is an end view from the right through the dashboard bracket.

It is to be understood that I do not desire to limit the application of this invention to the particular modification set forth herein and any change or changes may be made in material and structure consistent with the spirit or scope of the invention.

Referring in detail to the drawings I have shown a conventional automobile radiator 5 having a return pipe connection 6 in the lower portion of which is screw threaded a boss 7, which has a passage 8 therethrough, said boss projecting from a flange 9 of a screw threaded plug 10 in the lower end of which is an enlarged bore 11 with which the passage 8 communicates. A cylindrical casing 12 having wrench receiving faces 13 at its upper end, the said casing being of cylindrical form and provided with a closed bottom 14 having a central aperture 15, receives the lower end of the screw threaded section of the plug, the casing being formed with a shoulder or annulus 16 against which the lower end of the plug 10 abuts.

Within the large bore 11 and abutting the shoulder 17 defined by the small passage in the enlarged bore 11 is a coil spring 16 and projecting to seat upon a ball 19 which is in turn seated upon a rubber annulus (not shown) placed around a valve seat 20 on the upper edges of the aperture 15. A pair of arms 21 project in parallel spaced relation from the lower end of one side of the casing 12 and carry a pivot 22 therebetween for pivoting a hook shaped lever 23.

The point portion 24 of the hook is adapted to enter the aperture 15 and to contact ball 19 and to press the same out of engagement with its seat and open the valve and drain the fluid from the radiator. The upper end of the arm of the hook is connected to a flexible cable 25, and a short section of chain 26 having a ring at its end 27, is adapted to be drawn through a keyhole opening 28 in a dashboard attachment 29. It is obvious that when it is desired to pull the valve open and the ring or strap of the chain is drawn through the circular portion of the keyhole a link is then disposed sidewise into the slotted portion of the keyhole and the next projection of the chain will retain the same against displacement and retain the valve in draining position.

The dashboard attaching means comprises the U-shaped formation of flat material having downwardly directed leg portions 30, one end of one of said legs being provided with a thumb screw 31 to adjustably contact the inner side of the dashboard and to clamp the said U-shaped member in position thereon.

It will be obvious that my improved drain device is adaptable for installation on any makes of automobile, is very simple and easy to install, requiring but one hole to be drilled and tapped in the return pipe of the radiator and no special apparatus for the assembly thereof, is highly simplified in its nature, and it is also evident that my improved device may be inexpensively manufactured and is superior in operation and effectiveness.

Having thus described my invention, what I claim as new is:

1. An automobile radiator draining mechanism comprising in combination, a detachable screw clamp bracket for mounting on the dashboard of an automobile, said bracket being U-shaped and having a key hole aperture in an ear depending from one side of the bight portion of the bracket, a valve actuating medium consisting of a cable having a length of chain on its upper end for cooperating with said key hole aperture for locking the chain in adjusted positions, and a drain valve structure for mounting on the return pipe of the radiator adapted to be actuated by said medium.

2. An automobile radiator draining mechanism comprising in combination, a detachable screw clamp bracket for mounting on the dashboard of an automobile, said bracket being U-shaped and having a key hole aperture in an ear depending from one side of the bight portion of the bracket, a valve actuating medium consisting of a cable having a length of chain on its upper end for cooperating with said key hole aperture for locking the chain in adjusted positions, a drain valve structure for mounting on the return pipe of the radiator adapted to be actuated by said cable, comprising an externally screw threaded cylinder having a reduced externally screw threaded nipple on its upper end and a laterally projected flange positioned intermediate said cylinder and the lower end of the nipple, said nipple having a vertical bore communicating with an enlarged vertical bore in said cylinder; and a vertical cylindrical valve chamber having an internally screw threaded upper portion and a closed bottom apertured to form a valve seat, said upper portion of the chamber adapted to screw threadedly receive said first-mentioned cylinder, a yielding gasket on said valve seat, a ball for closing the aperture, a coiled spring having one end seated on the ball and the other end closely received in said enlarged bore in the first-mentioned cylinder, a pair of horizontally alined parallel ears projected from the exterior of the valve chamber adjacent the lower end thereof, a pivot across said ears, a J-shaped bell crank rockable on said pivot and between said parallel ears and having its hooked portion under said valve chamber and the extremity thereof introduced through the aperture for operative contact with the ball, the upper end of the crank adapted to be connected to said cable.

In testimony whereof I affix my signature.

DICK W. CARTER.